March 9, 1965 J. S. KRESGE 3,173,086
APPARATUS INCLUDING MECHANICAL VIBRATION DETECTOR MEANS
FOR DETECTING AND LOCATING INCIPIENT INTERNAL FAULTS
IN ELECTRIC INDUCTION APPARATUS
Filed July 18, 1962
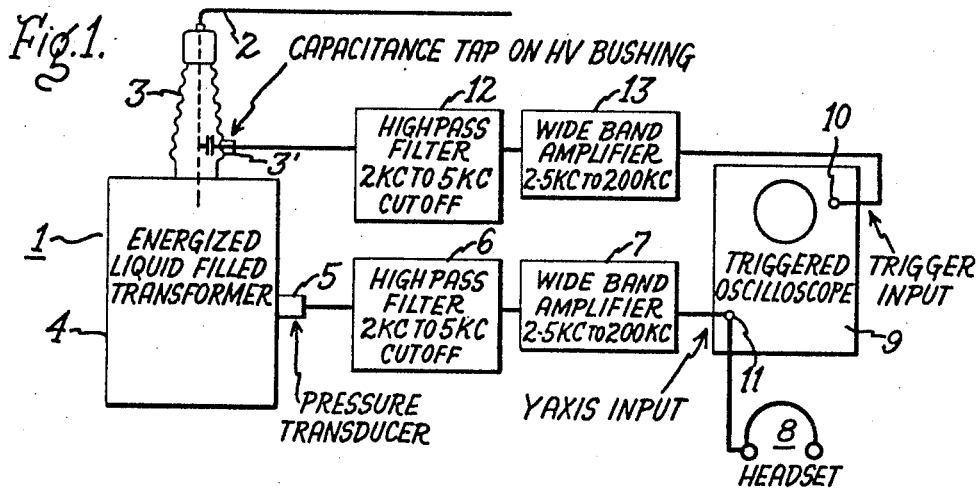
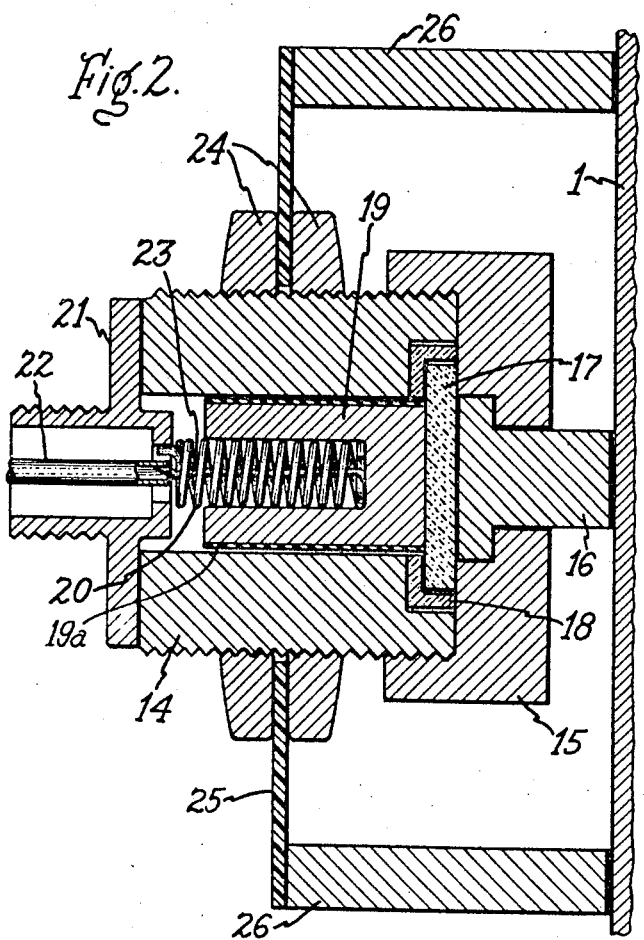
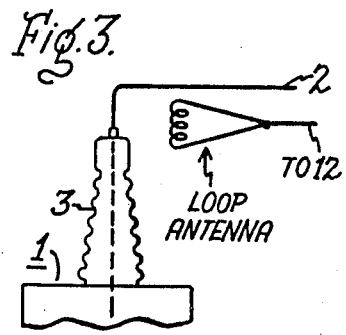
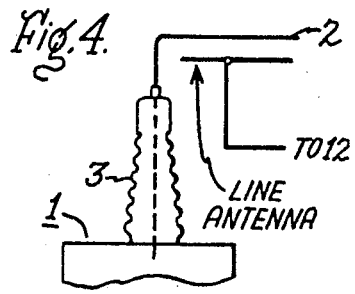
Inventor,
James S. Kresge,
by Gilbert P. Tarleton
His Attorney.

United States Patent Office 3,173,086
Patented Mar. 9, 1965

3,173,086
APPARATUS INCLUDING MECHANICAL VIBRATION DETECTOR MEANS FOR DETECTING AND LOCATING INCIPIENT INTERNAL FAULTS IN ELECTRIC INDUCTION APPARATUS
James S. Kresge, Rome, Ga., assignor to General Electric Company, a corporation of New York
Filed July 18, 1962, Ser. No. 210,681
2 Claims. (Cl. 324—52)

This invention relates to electrical fault detectors and more particularly to improvements in instruments for detecting and locating incipient faults in electric induction apparatus of the liquid-filled type.

A typical example of such appaartus is a power transformer which is insulated and cooled by mineral oil or askarel. It is believed that complete insulation failure of such apparatus is usually, if not always, preceded, and ultimately caused by, incipient faults encompassing such disturbances as corona discharges, arcing at loose connections or short-circuited winding turns, or discharge across the arcing contacts of tap changer switches.

An object of the invention is to provide a new and improved incipient failure detector and/or locator for encased and operatively energized liquid filled induction apparatus.

Another object of the invention is to provide a new and improved instrumentality of this kind which is portable and applied only to the outside of said apparatus.

Another object of the invention is to provide a simple, reliable, low cost device of this kind.

Another object of the invention is to provide an instrumentality of this kind which indicates instantaneously the presence or absence of an incipient failure not requiring lengthy analyses and/or historical records such as measurement of gas evolution or liquid quality.

In carrying out my invention in one preferred embodiment I provide a contact type transducer for picking up mechanical vibrations from a wall of the apparatus casing and converting them into electrical vibrations, a high pass filter for removing comparatively low frequency electrical vibrations from the output of said transducer corresponding to normal background noise produced by said apparatus, an electronic amplifier for amplifying any remaining high frequency electrical vibrations from the output of said transducer corresponding to vibratory disturbances caused by incipient failures of the apparatus and translating means for converting any such amplified high frequency electrical vibrations into a sensible signal.

The invention will be better understood from the following description taken in connection with the accompanying drawing, and its scope will be pointed out in the appended claims.

In the drawing,

FIG. 1 is a block diagram of a preferred embodiment of the invention,

FIG. 2 is a sectional view of a pressure or contact type transducer suitable for use with the invention, and FIGS. 3 and 4 are modifications illustrating respectively an unshielded loop antenna and a line antenna.

Referring now to FIG. 1 of the drawing, there is shown therein a stationary induction apparatus in the form of a conventional encased liquid filled power transformer 1, having an entrance line lead 2 passing through a high voltage insulating bushing 3 provided with a low voltage capacitance tap 3'. The transformer is normally energized through the lead 2 and it will be understood that the transformer may also be provided with the usual accessories such as an internal tap changing switch. It, of course, goes without saying that the main elements of the transformer are a magnetic core and conductive coil assembly which are electromagnetically interlinked.

For picking up vibrations produced by the energized electrical apparatus in the transformer tank or casing 4, there is provided a pressure transducer 5 which in operating principle is similar to a phonograph pick-up or microphone in that mechanical vibrations applied to it are converted into electrical vibrations. To facilitate the location of incipient faults the transducer must be capable of responding to vibrations at a rate of up to 200,000 cycles per second.

The details of a suitable type of transducer are shown in FIG. 2. It may consist of a main body portion 14 of brass of cylindrical shape and externally threaded. Threadedly attached to one end thereof there is a cap nut 15 between which and the main body portion 14 there is located a steel drive rod 16, a Piezoelectric ceramic crystalline member 17 and a mica washer 18. A steel backup block 19 is pressed against the backside of the Piezoelectric member 17 by a coil spring 20 retained in place by a cap 21 closing the other end of the main body 14 and insulatingly supporting an output conductor 22 which is connected to the backup block 19 by a pigtail lead 23. The block 19 is insulated from the body member 14 by a non-conducting sleeve 19a. The main body portion 14 is attached by means of jamb nuts 24 to supporting strips 25 of any suitable material whose ends are attached to permanent magnets 26 which may, for example, be horseshoe magnets and which serve to clamp the transducer magnetically to a wall of the tank 1. By means of the jamb nuts 24, the coplanar relationship between the end of the drive rod 16 and the magnets 26 may be adjusted. As is well known, Piezoelectric materials have the property of generating electrical potentials in accordance with mechanical forces applied thereto and in the arrangement shown when the transducer is clamped to the metal wall of the tank 1 its vibrations will be transmitted through the drive rod 16 to the Piezoelectric disk or wafer 17 whose electrical potentials will then be transmitted through the pigtail 23 to the output lead 22.

The electrical output of the transducer 5 is fed into a high pass filter 6 which, as is well understood in the art, consists of suitably chosen capacitors and inductors which can be made resonant at selected frequencies or over a range of frequencies so as to filter such frequencies out. The filter 6 is made to filter out frequencies below 2 to 5 kilocycles per second. Such comparatively low frequencies, which are in the audible range of frequencies, include the background noise produced in and by the transformer which is principally caused by magnetostriction of the steel making up the excited magnetic core of the transformer. A suitable filter is known commercially as Rytron #HP-240-2, 5 kc., 10,000 ohms. The remaining output of the high pass filter 6 which can only be high frequency electrical vibrations above 2 to 5 kilocycles per second is fed into a wide band electronic amplifier 7 of any suitable design. It should, however, be a good quality amplifier with a sensitivity in the order of 5 microvolts and a comparatively flat frequency response up to at least 200 kilocycles per second. A suitable amplifier is known commercially as General Radio Tuned Amplifier and Null Detector, type 1232–A. The output of the amplifier 7 is fed to any suitable translating device such as telephone headset 8 for converting the high frequency electrical vibrations into sound or air vibrations which a trained operator can interpret to detect incipient faults in the transformer 1 such as corona discharges or sparking. Suitable headphones are known commercially as Clevite, brush BA-220.

For locating an incipient fault in the transformer 1, a cathode ray oscilloscope 9 may be provided having a calibrated driven horizontal sweep with trigger input terminal 10 and a vertical deflection circuit with input terminal 11. Such devices are readily available on the market and as their details form no part of the present invention, the device 9 will not be further described, except to say that a suitable example is known commercially as Tektronix type 532. The output of the wide band amplifier 7 is shown connected to the vertical deflection or Y-axis input terminal 11.

The horizontal sweep circuit trigger input terminal 10 is connected to the low voltage capacitance tap 3' through a second high pass filter 12 and a second wide band amplifier 13 which can be essentially the same respectively as elements 6 and 7 which have previously been described. Inasmuch as any electrical disturbances in the transformer such as corona discharge or sparking will be reflected substantially instantaneously through conductive, capacitive, or inductive electric coupling to the supply lead 2 to the transformer which passes through the bushing 3, a simultaneous low voltage measure of the disturbance will appear at the capacitance tap 3' as a high frequency signal or pulse along with any other normal low frequency vibrations in the exciting or load current of the transformer. Any such low frequency vibrations will be filtered out by the filter 12 and any remaining high frequency vibrations caused by incipient faults will be amplified by the amplifier 13 and applied to the trigger input terminal 10.

The operation of the device shown in FIG. 1 for locating incipient faults or failures is as follows. Inasmuch as it requires appreciable time for physical vibrations to be transmitted through the liquid in tank 4 from the source of those vibrations to the tank wall, the vertical deflection or Y-axis trace of the oscilloscope will start at a definite time after time zero of the horizontal sweep determined by the energization of the trigger circuit input terminal 10. Consequently, this time difference or horizontal distance on the oscilloscope trace will be a measure of the distance between the transducer 5 and the internal source of the incipient fault in the tank 4. By moving the transducer 5 to different points on the transformer tank, the varying times or distances to the fault can be noted and then by simple triangulation the fault can be located.

The low voltage capacitance tap 3' on the high voltage bushing 3 of FIG. 1 is an integral part of most transformers and is a convenient point for picking off the desired electrical trigger signal. In cases where this tap is not available or where it is not convenient to use it the trigger signal may be derived by other means of capacitive or inductive coupling to the entrance lead such as by either a loop or a line antenna. FIG. 3 illustrates diagrammatically a loop antenna which may consist of about seven to ten turns of wire forming a ten to twelve inch diameter loop spaced up to about twenty feet from the entrance line lead 2. FIG. 4 illustrates diagrammatically a line antenna which may consist of about twenty feet of line conductor supported a few feet off the ground under the line entrance conductor 2.

While there have been shown and described particular embodiments of the invention, it will be obivous to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. An instrumentality for locating an incipient fault characterized by low energy sparking or corona discharge inside an encased liquid filled stationary electric induction apparatus from outside the casing of said apparatus while said apparatus is carrying current conducted through said casing by an entrance lead comprising, in combination, a cathode ray oscilloscope having a horizontal sweep trigger circuit input terminal and a vertical deflection circuit input terminal, coupling means associated with said entrance lead, means including a high pass filter and a wide band electronic amplifier for connecting said coupling means to said horizontal sweep trigger circuit input terminal whereby said horizontal sweep will be triggered substantially instantaneously in response to high frequency electrical disturbances reflected in said entrance lead from sparking or corona discharges in said apparatus, a contact type transducer in contact with a wall of the casing of said apparatus for picking up high frequency mechanical vibrations transmitted through said liquid to said wall by corona or spark discharge in said apparatus and converting them into corresponding frequency electrical oscillations, means including a second high pass filter and a second wide band amplifier for connecting said transducer to said vertical deflection input circuit terminal whereby the displacement of the vertical trace of said oscilloscope from the zero time point on the horizontal sweep axis will be a measure of the distance of said fault from said transducer.

2. An instrumentality for locating an incipient fault characterized by low energy sparking or corona discharge inside an encased liquid-filled stationary electric induction apparatus from outside the casing of said apparatus while said apparatus is carrying current conducted through said casing by an entrance lead comprising, in combination, a cathode ray oscilloscope having a pair of input terminals connected respectively to beam sweep circuits associated with orthogonally related beam sweep axes, electric coupling means associated with said entrance lead, means including a high pass filter and a wide band amplifier for connecting said coupling means to one said input terminal whereby the beam of said cathode ray oscilloscope will begin its sweep along one said axis instantaneously in response to a high frequency electrical disturbance reflected in said entrance lead from sparking or corona discharges in said apparatus, a contact type pressure transducer movably mounted in contact with an external wall of the casing of said apparatus for picking up high frequency mechanical vibrations transmitted through said liquid to said wall by corona or spark discharge in said apparatus and converting them into corresponding frequency electrical oscillations, means including a second high pass filter and second wide band amplifier for connecting said transducer to the other said input terminal of said oscilloscope whereby displacement of the said beam along the other said axis will be delayed with respect to its sweep along the first axis by reason of delayed transducer response to said electrical disturbance and such delayed response will be displayed on said oscillograph as a single axis deflection proportional to the distance from said fault to said transducer.

References Cited by the Examiner
UNITED STATES PATENTS
2,518,518  8/50  Beldi _____ 324—54
FOREIGN PATENTS
640,188  7/50  Great Britain.
OTHER REFERENCES
Liao et al.: "Detection of Corona in Oil at Very High Voltages," Electrical Engineering, volume 73, No. 12, December 1954, page 1081.

WALTER L. CARLSON, *Primary Examiner*.

Dedication 3,173,086.—*James S. Kresge*, Rome, Ga. APPARATUS INCLUDING MECHANICAL VIBRATION DETECTOR MEANS FOR DETECTING AND LOCATING INCIPIENT INTERNAL FAULTS IN ELECTRIC INDUCTION APPARATUS. Patent dated Mar. 9, 1965. Dedication filed Jan. 7, 1977, by the assignee, *General Electric Company*.

Hereby dedicates to the Public the entire terminal part of the term of said patent.

[*Official Gazette March 8, 1977.*]